(12) United States Patent
Rising

(10) Patent No.: US 7,577,684 B2
(45) Date of Patent: Aug. 18, 2009

(54) FAST GENERALIZED 2-DIMENSIONAL HEAP FOR HAUSDORFF AND EARTH MOVER'S DISTANCE

(75) Inventor: Hawley Rising, San Jose, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 575 days.

(21) Appl. No.: 11/398,326

(22) Filed: Apr. 4, 2006

(65) Prior Publication Data
US 2007/0233733 A1    Oct. 4, 2007

(51) Int. Cl.
*G06F 17/00* (2006.01)

(52) U.S. Cl. .................. 707/104.1; 707/101; 707/102; 707/103 R; 382/286

(58) Field of Classification Search ............. 707/1–10, 707/100–104.1, 200–206; 382/276–308
See application file for complete search history.

(56) References Cited

U.S. PATENT DOCUMENTS

| | | | |
|---|---|---|---|
| 5,136,655 A | 8/1992 | Bronson | 381/41 |
| 5,539,841 A | 7/1996 | Huttenlocher et al. | 382/218 |
| 5,999,653 A | 12/1999 | Rucklidge et al. | 382/227 |
| 6,285,805 B1 | 9/2001 | Gueziec | 382/299 |
| 6,335,768 B1 | 1/2002 | Reinold et al. | 348/723 |
| 6,562,077 B2 | 5/2003 | Bobrow et al. | 715/517 |
| 6,594,629 B1 | 7/2003 | Basu et al. | 704/251 |
| 6,611,803 B1 | 8/2003 | Furuyama et al. | 704/254 |
| 6,633,844 B1 | 10/2003 | Verma et al. | 704/251 |
| 6,710,822 B1 | 3/2004 | Walker et al. | 348/722 |
| 6,748,115 B1 | 6/2004 | Gross | 382/237 |
| 6,760,724 B1 | 7/2004 | Chakrabarti et al. | 707/4 |
| 7,031,980 B2 | 4/2006 | Logan et al. | |
| 7,292,728 B1 | 11/2007 | Gupta et al. | |
| 7,463,769 B2 | 12/2008 | Lin et al. | |
| 7,477,780 B2 | 1/2009 | Boncyk et al. | |

(Continued)

OTHER PUBLICATIONS

Yossi Rubner et al., "A Metric for Distributions with Applications to Image Databases", Proceedings of the 1998 IEEE International Conference on Computer Vision, Bombay, India, 8 pages.

(Continued)

*Primary Examiner*—Isaac M Woo
(74) *Attorney, Agent, or Firm*—Haverstock & Owens LLP

(57) ABSTRACT

A method of measuring distance between two distributions of data points in a space is described. The distances between data points are ordered in a plurality of heaps stored within 2-D heaps, which is constructed by giving heap structure to a list of one-dimensional heaps. Each plurality of heaps is ordered so that the minimum distance is the root node. The plurality of heaps within the 2-D heaps are ordered to determine the maximum of the root nodes. The maximum of the 2-D heaps are compared to determine the Hausdorff distance which is the greater of the maximums. The corresponding heaps are removed from their respective 2-D heaps. The Hausdorff distance is utilized in a set of calculations to generate an EMD. Determining the Hausdorff distance and generating the EMD is repeated until no more earths and no more holes remain. After all earths are moved to all holes, the work is established, and the similarity of the plurality of images is determined.

21 Claims, 9 Drawing Sheets

U.S. PATENT DOCUMENTS

| | | | |
|---|---|---|---|
| 2001/0042114 A1 | 11/2001 | Agraharam et al. | 709/223 |
| 2002/0006266 A1 | 1/2002 | Yoon et al. | 386/69 |
| 2005/0102107 A1 | 5/2005 | Porikli | 702/20 |
| 2006/0041375 A1 | 2/2006 | Witmer et al. | 701/208 |

OTHER PUBLICATIONS

D.P. Huttenlocher et al., "Comparing Images Using the Hausdorff Distance", IEEE Transactions on Pattern Analysis and Machine Intelligence, vol. 15, No. 9, pp. 850-863, Sep. 1993.

R.E. Tarjan, "Data Structures and Network Algorithms", 1983.

FAST GENERALIZED 2-DIMENSIONAL HEAP FOR HAUSDORFF AND EARTH MOVER'S DISTANCE

FIELD OF THE INVENTION

The present invention relates to the field of data processing. More specifically, the present invention relates to an improved method of image processing using a 2-Dimensional Heap, Hausdorff Distance and Earth Mover's Distance (EMD).

BACKGROUND OF THE INVENTION

The ability to efficiently manage large sets of data is difficult and usually very time consuming and inefficient. One reason is that the concept of a "large" set of data continues to grow with time. In 1980, a megabyte worth of data was "large." In 1990, it was a gigabyte and in 2000, a terabyte. As data grows, people develop technologies for specific applications of these large data sets. One example of a specific application which utilizes large amounts of data includes image comparison.

Image comparison has a number of applications, including image-based searching. Text-based image searching has been prominent for years. Using text-based searching, for a user to search for images, the images are generally stored in databases with corresponding text phrases such as titles, keywords or captions. The user's search is then based on an entered keyword, and the search returns images if the entered keyword matches one of the text phrases. However, with larger sets of image data, it becomes impractical to store all of the images with text indexes to correspond with each image. It is also highly burdensome for someone to manually attribute specific titles, keywords and captions to each one. Furthermore, text-based searches have their inherent drawbacks as well.

In recent years, image-based searching has become a possible alternative. However, before image-based searching is possible, the data to be searched must exist in a searchable format. One approach to putting the data in such a format included compression by partitioning the underlying space into fixed-size bins where the resulting structure is called a histogram. However, histograms have a number of drawbacks. A finely quantized histogram where the image is mainly a few colors is highly inefficient. But, for a complex image with many colors, a coarsely quantized histogram would be inadequate. Thus, because histograms are fixed-size structures, they cannot achieve the proper balance between expressiveness and efficiency.

Another technique was developed to improve image comparison and image searching capabilities while avoiding some of the drawbacks of histograms. Earth Mover's Distance (EMD) is a distance between two distributions, which reflects the minimal amount of work that must be performed to transform one distribution into the other by moving "distribution mass" around. EMD generally requires a lot of computation power because a large set of data is being compared and many computations must occur. There are many ways of determining EMD, but generally they are accomplished in linear time. Clearly, as datasets grow, where images become more complex with higher definition, a method that functions in linear time is far too inefficient. A number of attempts have been made to improve the efficiency of image comparison.

U.S. Pat. No. 5,999,653 to Rucklidge, discloses fast, low-overhead implementations of a powerful, reliable image matching engine based on the Hausdorff distance. In one such implementation, a method is provided in which a processor receives two inputs. The first input is a pattern to be recognized in an image; the second, a digital image in which the pattern is to be recognized. The digital image is preprocessed with the processor using various morphological dilation operations so as to produce a set of preprocessed digital images. Thereafter, the processor performs a hierarchical search for the pattern in the digital image. The hierarchical search is performed over a search space, and includes a series of decisions, each decision indicating whether a portion of the search space can be eliminated from the search. Each decision is made by performing a plurality of comparisons between the pattern and the preprocessed digital images of the set and analyzing the results of these comparisons. Once the search is complete, the processor outputs a search outcome indicating whether (and where) the pattern has been found in the image.

U.S. Pat. No. 6,748,115 to Gross discloses an improved distance measure for determining a match between models which uses a modification of the Hausdorff measure by limiting such measure to a single quadrant, resulting in a lower mismatch rate.

Other approaches to improving the efficiency of the distance calculations have approximated the composite distances or have avoided them which causes problems with accuracy. Many Hausdorff distance calculators use a method of sifting through all the data multiple times to get the components of the distance function which is very inefficient.

Calculating Hausdorff distances and EMD is generally very computationally expensive and involves complex and costly hardware. Although attempts have been made at improving calculating a Hausdorff distance and EMD, they are still very inefficient.

SUMMARY OF THE INVENTION

A method of measuring distance between two distributions of data points in a space is described. The distances between data points are ordered in a plurality of heaps stored within 2-D heaps, which is constructed by giving heap structure to a list of one-dimensional heaps. Each plurality of heaps is ordered so that the minimum distance is the root node. The plurality of heaps within the 2-D heaps are ordered to determine the maximum of the root nodes. The maximum of the 2-D heaps are compared to determine the Hausdorff distance which is the greater of the maximums. The corresponding heaps are removed from their respective 2-D heaps. The Hausdorff distance is utilized in a set of calculations to generate an EMD. Determining the Hausdorff distance and generating the EMD is repeated until no more earths and no more holes remain. After all earths are moved to all holes, the work is established, and the similarity of the plurality of images is determined.

In one aspect, a method of calculating a Hausdorff distance comprises computing a plurality of distances from a first set of data points to a second set of data points, inputting the plurality of distances into two 2-Dimensional heaps wherein the first 2-Dimensional heap contains a first plurality of heaps and the second 2-Dimensional heap contains a second plurality of heaps, determining a minimum within each heap in the first plurality of heaps and the second plurality of heaps, determining a first maximum within the first 2-Dimensional heap and a second maximum within the second 2-Dimensional heap and calculating the Hausdorff distance by determining the greater of the first maximum and the second maximum. Each heap within the first plurality of heaps and each heap within the second plurality of heaps are ordered using a "less than" operator. The first 2-Dimensional heap and the second 2-Dimensional heap are ordered using a "greater than" operator.

In another aspect, a system for comparing two images comprises a first image, a second image to be compared with the first image and a program to determine an earth mover's distance to compare the first image with the second image, wherein the earth mover's distance is calculated by determining the work required to move one or more earths to one or more holes wherein the one or more earths and the one or more holes correspond to colors of the first image and the second image, further wherein the earth mover's distance is calculated using Hausdorff distances which are maximum minimum distances between the first image and the second image. The Hausdorff distance is determined by using one or more 2-Dimensional heaps. The plurality of 2-Dimensional heaps each contain a plurality of heaps further wherein the plurality of heaps are ordered using a "less than" operator and the plurality of 2-Dimensional heaps are ordered using a "greater than" operator. A plurality of distances of data points between the first image and the second image are determined and stored within the plurality of heaps to calculate the Hausdorff distance. A keyword is used to determine the second image to compare. Alternatively, the second image is selected by a user. The shorter the earth mover's distance, the more similar the first image and the second image are. The first image and the second image are compared over the Internet. Alternatively, the first image and the second image are compared on a computing device selected from the group consisting of a personal computer, laptop, digital camera, digital camcorder, handheld, iPod® and home entertainment system.

In yet another aspect, a method of comparing a first image with a second image, comprises determining a Hausdorff distance using a plurality of 2-Dimensional heaps which comprises ordering a plurality of heaps within each of the plurality of 2-Dimensional heaps to determine a minimum within each of the plurality of heaps, ordering the plurality of 2-Dimensional heaps to determine a maximum within each of the plurality of 2-Dimensional heaps and calculating a maximum between the plurality of 2-Dimensional heaps and calculating an earth mover's distance using the Hausdorff distance by determining the work required to move one or more earths to one or more holes wherein the one or more earths and the one or more holes correspond to colors of the first image and the second image. The method further comprises computing a plurality of distances of data points between the first image and the second image. The method further comprises inputting the plurality of distances into the plurality heaps within each of the 2-Dimensional heaps. A keyword is used to determine the second image to compare. Alternatively, the second image is selected by a user. The shorter the earth mover's distance, the more similar the first image is to the second image. Comparing occurs via the Internet. Alternatively, comparing occurs on a computing device selected from the group consisting of a personal computer, laptop, digital camera, digital camcorder, handheld, iPod® and home entertainment system.

In another aspect, a system for locating data comprises an image, one or more sets of data and a program to search for the image wherein the program determines an earth mover's distance to compare the image with the one or more sets of data, further wherein the earth mover's distance is calculated by determining the work required to move one or more earths to one or more holes wherein the one or more earths and the one or more holes correspond to colors of the image and the one or more sets of data, further wherein the earth mover's distance is calculated using Hausdorff distances which are maximum minimum distances between the image and the one or more sets of data. The Hausdorff distance is determined using a plurality of 2-Dimensional heaps. The plurality of 2-Dimensional heaps each contain a plurality of heaps further wherein the plurality of heaps are ordered using a "less than" operator and the plurality of 2-Dimensional heaps are ordered using a "greater than" operator. A plurality of distances of data points between the image and the one or more sets of data are determined and stored within the plurality of heaps to calculate the Hausdorff distance. The one or more sets of data are selected from the group consisting of images and videos. The program uses a keyword to determine the image to compare. Alternatively, the program uses the image selected by a user to compare. The program retrieves the one or more sets of data which are similar to the image. The program lists the one or more sets of data according to similarity to the image. The smaller the earth mover's distance, the more similar the image is to the one or more sets of data. The program searches over the Internet. Alternatively, the program searches on a computing device selected from the group consisting of a personal computer, laptop, digital camera, digital camcorder, handheld, iPod® and home entertainment system.

In yet another aspect, a method of locating one or more images comprises selecting a first image to search for, comparing the first image with one or more second images, which comprises determining a Hausdorff distance using a plurality of 2-Dimensional heaps which comprises computing a plurality of distances between data points of the first image and the second image, inputting the plurality of distances into a plurality of heaps within the plurality of 2-Dimensional heaps, ordering the plurality of heaps within each of the plurality of 2-Dimensional heaps using a "less than" operator, ordering the plurality of 2-Dimensional heaps using a "greater than" operator and calculating a maximum between the plurality of 2-Dimensional heaps and calculating an earth mover's distance using the Hausdorff distance by determining the work required to move the one or more earths to the one or more holes wherein the one or more earths and the one or more holes correspond to colors of the first image and the one or more second images and retrieving the one or more second images that are similar to the first image. The method further comprises plotting the first image and the one or more second images to a color model. The color model is CIE L*a*b*. Selecting comprises entering in a keyword upon which an image matching that keyword is utilized to compare. Alternatively, selecting is performed by a user. The method further comprises listing the one or more second images according to similarity to the first image. A smaller earth mover's distance means a higher similarity between the first image and the one or more second images. Comparing and retrieving occurs via the Internet. Alternatively, comparing and retrieving occurs on a computing device selected from the group consisting of a personal computer, laptop, digital camera, digital camcorder, handheld, iPod® and home entertainment system.

In another aspect, a method of computing an earth mover's distance between a first and a second image comprises plotting the first image to a color model, plotting the second image to the color model, determining the size of one or more earths, wherein the one or more earths are derived from the first image, determining the size of one or more holes, wherein the one or more holes are derived from the second image, computing a plurality of distances of a plurality of data points within the first image to a plurality of data points within the second image, inputting the plurality of distances into two 2-Dimensional heaps wherein the first 2-Dimensional heap contains a first plurality of heaps and the second 2-Dimensional heap contains a second plurality of heaps, determining a minimum within each heap in the first plurality of heaps and the second plurality of heaps, determining a first maximum within the first 2-Dimensional heap and a second maximum within the second 2-Dimensional heap, removing the heaps from which the first maximum and the second maximum are from, calculating the Hausdorff distance by determining the greater of the first maximum and the second maximum, moving the one or more earths to the one or more holes utilizing the Hausdorff distance and determining Earth Mover's Distance based on work of moving the one or more earths to the one or more holes. The color model is CIE L*a*b*. The method further comprises repeating steps g-k until there are no more earths and no more holes remaining.

DETAILED DESCRIPTION OF THE PREFERRED EMBODIMENT

Speed is always an issue when using distance measures that are composites of underlying distances, like the Hausdorff distance or the Earth Mover's Distance (EMD). The method described herein addresses the issue of rapid calculation of Hausdorff distance and of rapid construction of the EMD from the Hausdorff distances. Generally, the method serially or in parallel implements an array of decision making processes, like a lattice gas or neural net, which features a lightweight per node processing using winner-take-all without modification or other more complex operations with additional processing. An efficient update structure is also utilized. With the improvements in speed, more efficient applications are possible such as image comparison and content based image retrieval.

A Hausdorff distance is the maximum distance of a set of data points to the nearest data point in another other set of data points. Specifically, the Hausdorff distance from a first set, set A, to a second set, set B, is a maximin (maximum of the minimums) function, defined as:

$$h(A, B) = \max_{a \in A} \{\min_{b \in B} \{d(a, b)\}\}$$

where a and b are points within sets A and B respectively, and d(a, b) is a distance between the points a and b. The converse distance, h(B, A), must be analyzed as well, to achieve the total Hausdorff distance. The maximum of h(A, B) and h(B, A) gives the total Hausdorff distance.

Figure 1A:
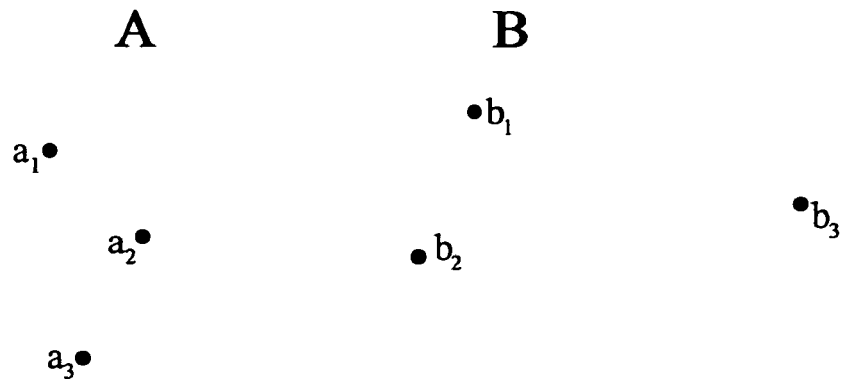
FIGS. 1A-F illustrate an exemplary determination of a Hausdorff distance.
Figure 1B:
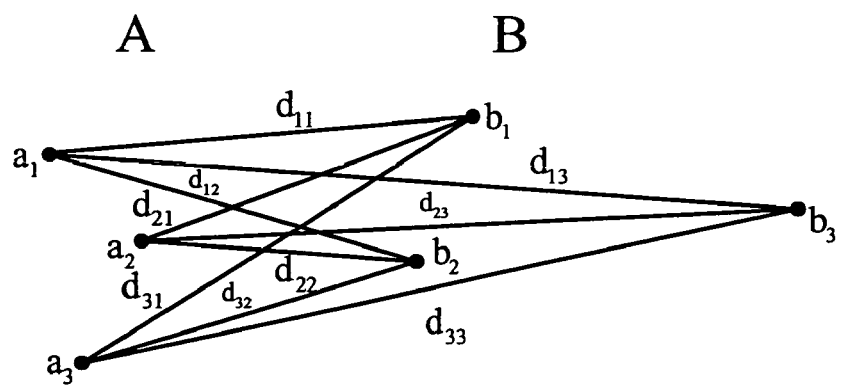
Figure 1C:
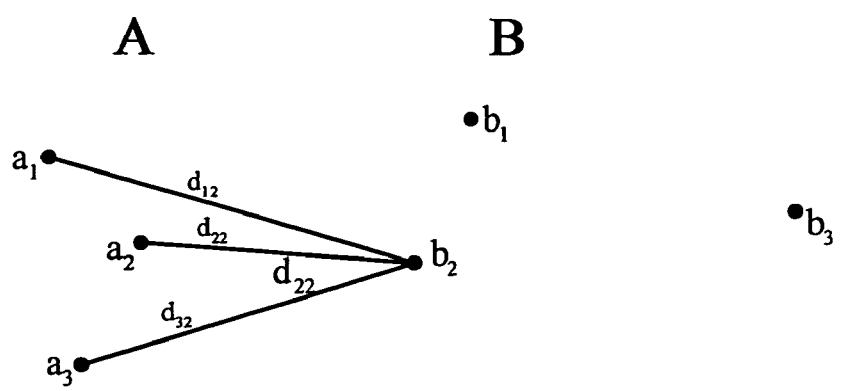
Figure 1D:
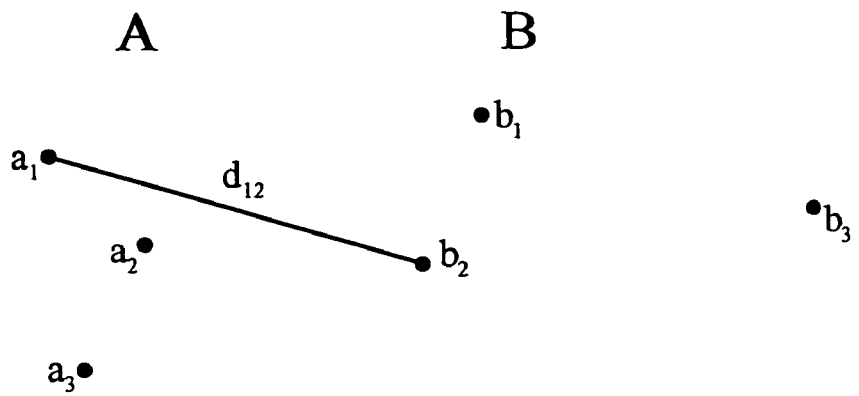
Figure 1E:
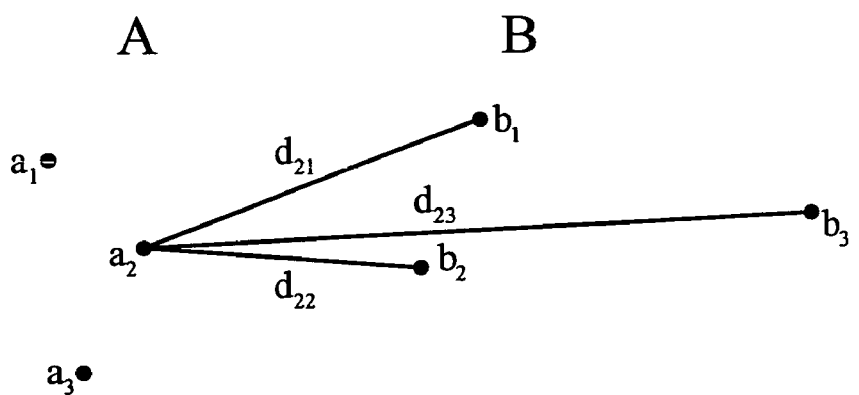
Figure 1F:
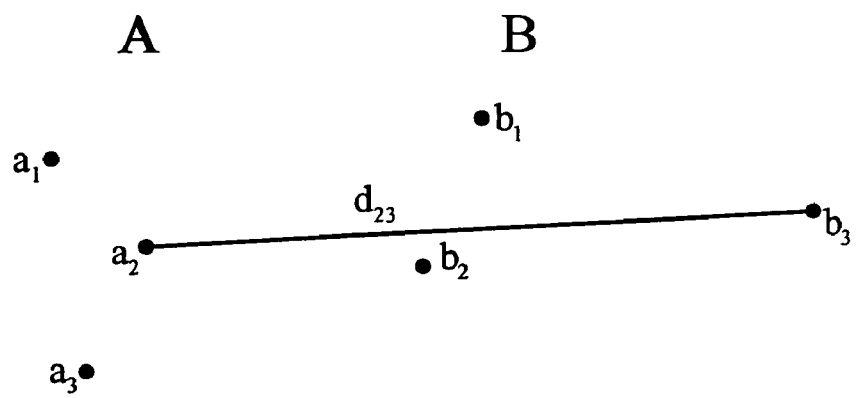

FIGS. 1A-F illustrate an exemplary determination of a Hausdorff distance. Initially shown in FIG. 1A, Set A comprises three data points $(a_1, a_2, a_3)$, and Set B comprises three data points $(b_1, b_2, b_3)$. The example is simplified for purposes of illustration, where realistically, each set typically has numerous data points. In FIG. 1B, distances are computed between each data point in the Set A and each data point in the Set B such that the distance between data point $a_1$ and data point $b_1$ is $d_{11}$, and so on through $d_{33}$. After all of the distances are computed between the data points of the Sets A and B, the minimum distances are retained. In this example, the minimum distances are $d_{12}$, $d_{22}$ and $d_{32}$, as shown in FIG. 1C. Continuing through the above equation, after the minimum distances are found, then the maximum of the minimums must be determined. FIG. 1D shows that the maximum distance from the Set A to the Set B is $d_{12}$, the distance between data points $a_1$ and $b_2$. As described above, the distance from the Set B to the Set A must be determined as well. In FIG. 1E, the minimum distances from the Set B to the Set A are established, wherein $d_{21}$, $d_{23}$ and $d_{22}$ are the minimums. Then in FIG. 1E, the maximum of the minimums is determined which is $d_{23}$, the distance between the data points $b_3$ and $a_2$. Thus, two maximums have been found, $d_{12}$ and $d_{23}$. Ultimately, the maximum of the minimum distances between the Sets A and B determines the Hausdorff distance. Thus, here, where the distance $d_{23}$ is greater than $d_{12}$, the Hausdorff distance is $d_{23}$. Therefore, the furthest distance between a data point of either the Set A or the Set B to a data point of the other set is $d_{23}$.

Utilizing a data structure called a heap, the computation time of Hausdorff distances and EMD is improved dramatically. The heap is explained further in R. E Tarjan, *Data Structures and Network Algorithms,* 1983, which is herein incorporated by reference. The heap is data organized in a tree structure such that at each node, the value of the node satisfies an inequality relation with its children. For example, a heap is able to order data from least to largest by using the inequality "less than (<)." Conversely, the heap is also able to order data from largest to smallest by using the inequality "greater than (>)." For a heap using "less than" to order the data, the smallest number is located at the root, and for a heap using "greater than" to order the data, the largest number is located at the root.

To build a heap, three pieces of data are compared with each other, and the smallest is the parent while the other two are the children, assuming the "less than" inequality is implemented. Conversely, the largest node is the parent if "greater than" is utilized. Then as new data is entered into the heap, a function called sift-up, manipulates the nodes so that the new data is positioned correctly. The new data starts at the bottom of the heap and is compared with its parent. If it is "less than" its parent, the new data and the parent are swapped. The process of "sifting up" continues until the new data is not "less than" its parent or reaches the root node, meaning there are no other nodes to compare with, and it is the smallest node within the heap. When a node is removed from a heap, the most recently added data is put in the vacancy from the removal of the node. Then that data is "sifted down" using the sift-down function which compares the node with its smallest child. If the node is "less than" than its smallest child, it does not move. However, if the node is larger than its smallest child, the child and it swap places. The process repeats until the node is "less than" its smallest child or reaches the end of the heap. The above explanation utilized a "less than" inequality where a minimum was at the root. If instead, a maximum was at the root, the comparisons where "less than" was used would be replaced with "greater than."

A heap in one-dimension (1-D) is able to store information as described above, based on the inequality of either "less than" or "greater than" where each node abides by the inequality's rule. Depending on the inequality used, the root node of the heap is either the largest or smallest node in the set of data. By taking a set of 1-D heaps and putting them in another 1-D heap structure, a two-dimensional (2-D) heap structure is generated where there is a heap of heaps. The heaps within the heap are able to have their own inequality for comparison, and then the heap containing the heaps is able to have its own inequality for comparison of its nodes.

Figure 2A:
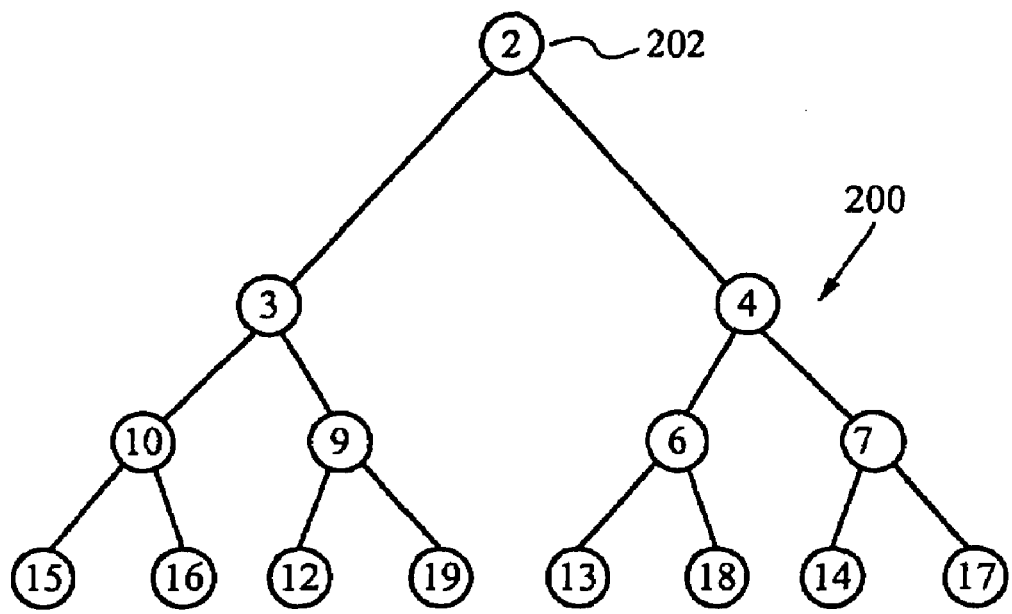
FIG. 2A illustrates an exemplary heap in tree form.
Figure 2B:
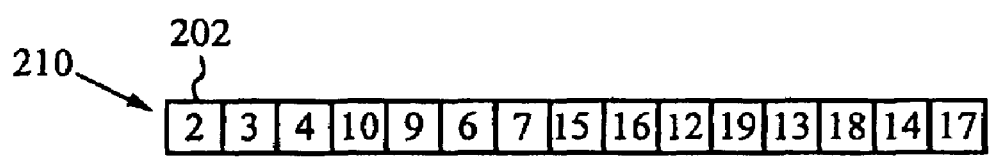
FIG. 2B illustrates an exemplary heap in array form.

An exemplary heap in tree form 200 is shown in FIG. 2A, utilizing the "less than" operator to order the children of the parent. Using the "less than" operator the smallest number ultimately reaches the root node 202 in the tree 200. In the example in FIG. 2A, the root node 202 has a value of 2. In FIG. 2B, the heap is laid out in memory as a flat array 210. Within the array 210, the root node 202 is at the beginning of the array 210 at index 0 of the array 210. The heap has a fixed number of children for each node, for example a binary heap with two children. The heap algorithm described above calculates the position of the children in the array. Consequently, using two-dimensional pointers to an array of given height and width, horizontal arrays are constructed which are configured as heaps, and a vertical array is configured as a heap of heaps. The horizontal heaps are configured using "less than (<)," and the vertical heap using "greater than (>)" as inequalities. For the Hausdorff distance, two 2-D arrays are implemented because as shown above in FIGS. 1A-F, there are two maximums needed to determine the Hausdorff distance. The two arrays are transposes of each other. Once they are constructed, pulling off the top item from each 2-D heap and choosing the maximum of those top items yields the Hausdorff distance.

Referring back to FIGS. 2A and 2B, data within the heap is able to be any data, but for this application, the data is distances between data points. As described above, to determine a Hausdorff distance, one of the steps requires determining the minimum distance between one set of points to another. The exemplary heap shown in FIGS. 2A and 2B utilizes the "less than" inequality with distances between data points and determines the minimum distance between those data points, e.g. the root node 202. As stated, the minimum distance is one component needed to compute a Hausdorff distance.

Figure 2C:
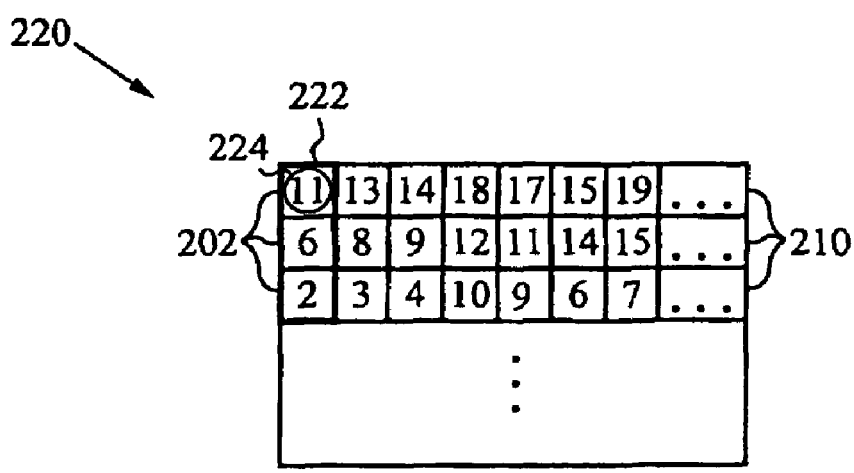
FIG. 2C illustrates an exemplary 2-Dimensional heap containing Hausdorff distances.

FIG. 2C illustrates an exemplary 2-D heap 220 containing data related to Hausdorff distances. As discussed above, the horizontal rows 210 of the 2-D heap are the heaps of the distances between data points wherein a "less than" inequality is used to determine the minimum distance. Each individual horizontal row 210 is equivalent to the array 210 shown in FIG. 2B. The minimum distance is at the root node 202 of each horizontal row 210. In the example in FIG. 2C, the root nodes 202 of each horizontal row 210 have values of 11, 6 and 2, hence the minimum distances between three data points to another set of data are 11, 6 and 2. Another heap 220, actually a heap of heaps, utilizes a vertical row 222 of data. However, the 2-D heap 220 or heap of heaps is ordered using a "greater than" inequality such that a maximum is located at the root node 224. Here, for example, the three minimum distances found were 11, 6 and 2, thus the maximum distance of the minimums is 11. A second 2-D array (not shown) contains similar information, except it is data going in the opposite direction (e.g. from Set B to Set A wherein the first 2-D heap contained data from Set A to Set B). For example purposes, assume the second 2-D array has a maximin of 9, meaning 9 is the root node of the second 2-D array just like 11 is the root node of the first 2-D array. Therefore, since the Hausdorff distance is the maximum of the maximums between Set A to Set B and Set B to Set A, the Hausdorff distance in this example is 11, as it is greater than 9.

As shown by ellipses within FIG. 2C, the 2-Dimensional structure is not limited in size, such that the horizontal rows 210 are able to contain as many elements as needed. Furthermore, although only three horizontal rows 210 are shown, the number of horizontal rows 210 is able to be larger as well. The elements in the horizontal rows 210 correspond to the distances between a data point and other data points, thus the elements depend on the number of data points to be compared with the each data point (Set B), and the number of horizontal rows 210 corresponds to the number of data points that are used to be compared (Set A).

To the 2-D heaps, pointers are added that allow each element of each of these arrays to find its counterpart and the counterpart's row in the other 2-D array. After the Hausdorff distance is pulled off, along with eliminating the row from one array and the counterparts of the row from the other, based on the smaller weight of the row, the EMD is able to be calculated by summing the appropriate Hausdorff distances. No distances are calculated any further than determining whether they win or lose, so the result is very fast, changing the searches through the distance values for doing the Hausdorff and then EMD contributions in a time corresponding to O(2 log n) compares. Therefore, the burden of all the comparisons is less than the computation required to sort the distances once.

Generalizing this method, all that is required to do a 2-D or multidimensional heap is a per node definition of how to promote an element in the heap. When the algorithm for promotion is a simple inequality, so that the heap does a winner take all (WTA) calculation at each node, it resembles neural nets used to do saliency calculations and attention based algorithms. When it is a nonlinear summation, a path through the generalized heap resembles a densely interconnected neural network. If multiple heaps are defined at each point, and configured to be directional, then the process is similar to a lattice gas algorithm (e.g. related to cellular automata).

However, for the WTA algorithm, the computation per node is extremely light. It is simply a numerical inequality in one direction and a compare in the other. The processing for some calculations like the Hausdorff distance is able to be calculated in parallel on a per row basis. In the generalized form, calculation order will alter the effect of parallel processing of the array, but in any path for which the array is strictly a heap, the processing leads to the same sort, with no operation, NO-OP, for nodes that are already ordered, but must wait until all nodes have ceased activity.

The sift-up, sift-down and delete-best functions of interacting with the heap have been modified. During sift-up and sift-down, the routines update the pointers to any nodes that get moved through the heap from their counterparts. Sift-up and sift-down are overloaded to work on elements and their pointers. A delete-item function deletes any item in the array by sifting down from its position in each heap that it is in. This allows only two additional parameter settings per use of the sift-up and sift-down operations.

The generalization will have to add pointers if there are multiple array correspondences. Overloading the inequality operators or replacing them if the function signature is not right is all that is required to then generalize the step at each node to sum-and-threshold for neural nets or vector sum for lattice gases.

EMD is figured out by taking the Hausdorff distance and using that distance to move an earth into a hole. By moving the earth to the hole, that eliminates either an earth, a hole or both, depending on the size of the earth and the hole. The process of utilizing a Hausdorff distance to move an earth to a hole is repeated until all of the earths have been moved to all of the holes and neither exists anymore.

Figure 3:
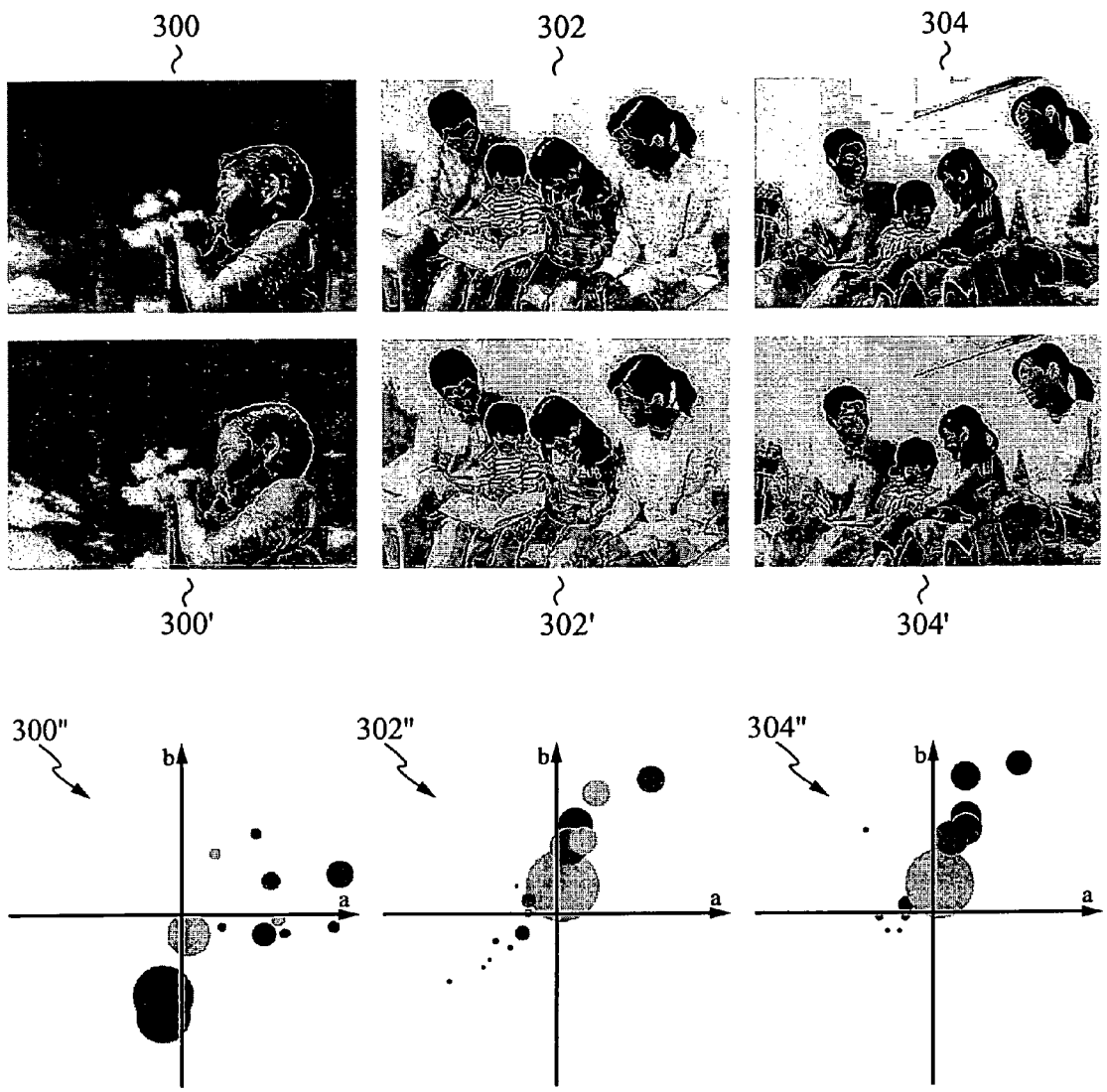
FIG. 3 illustrates three images in their original form, after color reduction form and CIE L*a*b* color space form.

The following is an example of how EMD is used to find the distance between two images. The distance between two images indicates how different the two images look. FIG. 3 shows three images. The top row shows the original images 300, 302 and 304. The middle row shows the images after the number of colors has been reduced to sixteen, 300', 302' and 304'. The bottom row shows the colors contained in the images plotted in CIE L*a*b* color space where the size of each circle is proportional to the amount of that color in the images, 300'', 302'' and 304''. The center of each circle is located at the coordinate that corresponds to the color in L*a*b* space. CIE L*a*b* is a color model used to describe all of the colors visible to the human eye. The first of the three parameters in the model represents the luminance of the color wherein L=0 indicates black and L=100 indicates white. The position between red and green is indicated in "a" wherein negative values indicate green and positive values indicate red. The position between blue and yellow is indicated in "b" wherein negative values indicate blue and positive values indicate yellow. The L* value is omitted for clarity, here. The distance between images is calculated based on the color distribution shown in the right column of FIG. 3. EMD is one way of calculating the distance between two distributions.

Figure 4:
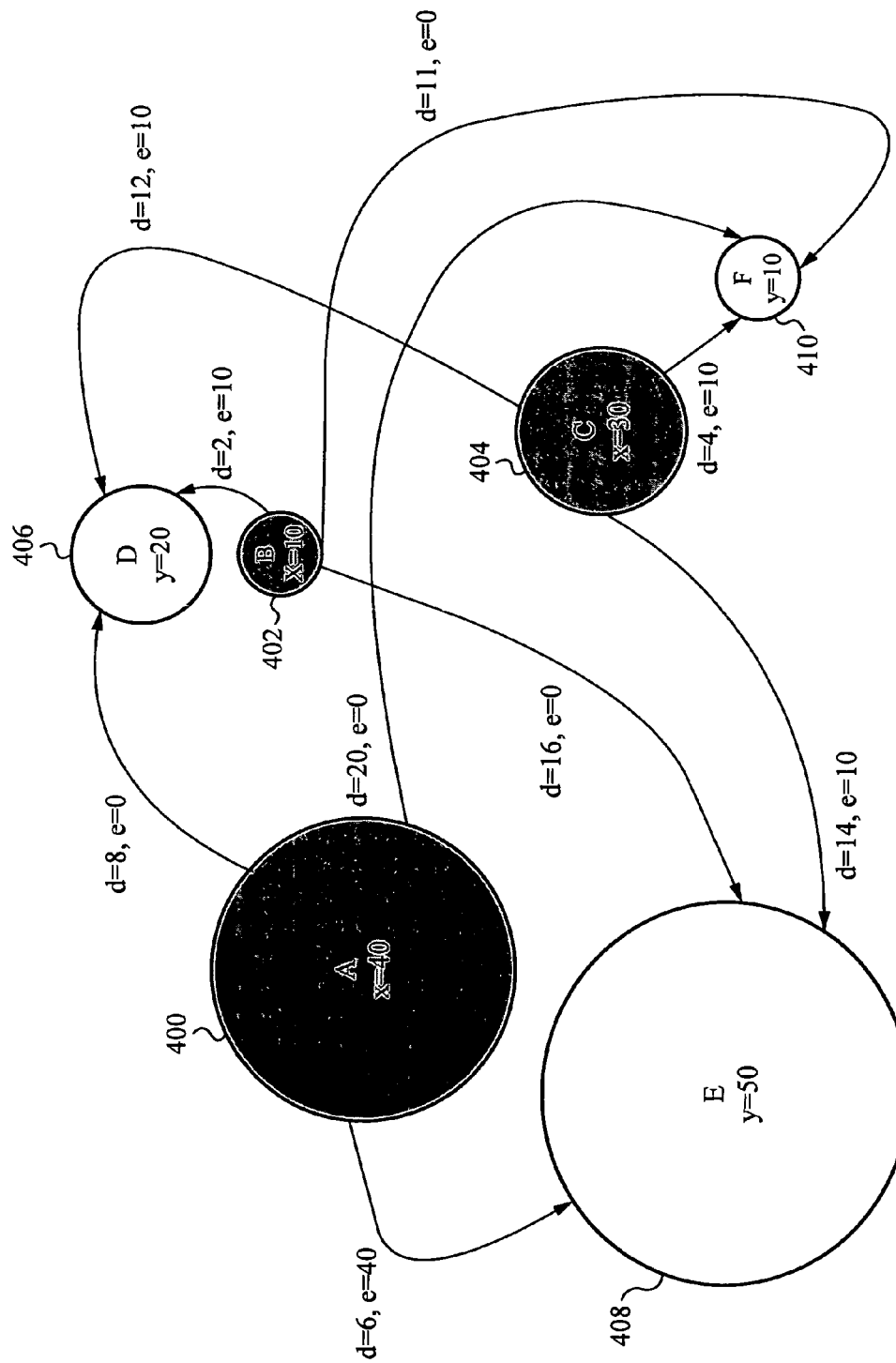
FIG. 4 illustrates a graphical representation of holes and earth including sizes and distances.

Intuitively, given two distributions, one is able to be seen as a mass of earth properly spread in space, the other as a collection of holes in that same space. It is assumed that there is the same amount of earth and holes, if not, either the holes or the earth are able to be scaled to fit the other. The EMD measures the least amount of work needed to fill the holes with earth. A unit of work corresponds to transporting a unit of earth by a unit of (ground) distance. For example, FIG. 4 illustrates graphical representations of holes and earth. The open circles represent holes. The shaded circles represent earth. The Euclidian distances between the circles are the distances used when calculating the EMD. Distances are denoted d, specifically Hausdorff distances, and the earth moved is denoted e. The amount of earth is denoted x, and the sizes of the holes are denoted y.

The EMD can be expressed as:

$$EMD = \min \sum_{i \in I} \sum_{j \in J} d_{ij} e_{ij} \quad (1)$$

where:
I is the set of earth
J is the set of holes
$d_{ij}$ is the distance between earth i∈I and hole j∈J
$e_{ij}$ is the amount of earth moved from earth i∈I to hole j∈J
constraints:

$$d_{ij} \geq 0 \quad (2)$$

-continued $$\sum_i e_{ij} = y_j \quad (3)$$

$$\sum_j e_{ij} = x_i \quad (4)$$

where:
$x_i$ is the size of earth i∈I
$y_j$ is the size of hole j∈J

Equation (2) ensures that there are no negative distances. Equation (3) prevents moving more earth to a hole than the size of the hole. Equation (4) prevents moving more earth from a location than the amount of earth at that location. For example, in FIG. 4, using the equations and restrictions above, the earth A 400, of size 40 is moved a distance of 6 to hole E 408 with a hole size of 50. Since that moves all of earth A 400 to a hole, earth A 400 is not moved to any other holes. But hole E 408 has a hole size of 50 and only 40 has been used, so it is able to receive more earth. Earth B 402 of size 10 is moved a distance of 2 to hole D 406 with a hole size of 40. That moves all of earth B 402 to a hole, so earth B is not moved to any other holes. Hole D 406 still has space for more earth. Only 10 units of Earth C 404 of size 30 are moved a distance of 4 to hole F 410 because hole F 410 is only size 10. The rule that a hole cannot receive more earth than its size must be followed. Thus, another 10 of Earth C 404 goes a distance of 14 to hole E 408 since it still had space after earth A 400. Also, the other 10 of Earth C 404 goes a distance of 12 to hole D 406 which had space after earth B 402. Ultimately, the EMD is:

EMD=6·40+2·10+14·10+4·10+12·10=240+20+140+ 40+120=560 which is how much work was required to move the earth to the holes. More practically, it determines how dissimilar two images are, wherein the lower the work, the more similar they are.

Figure 5:
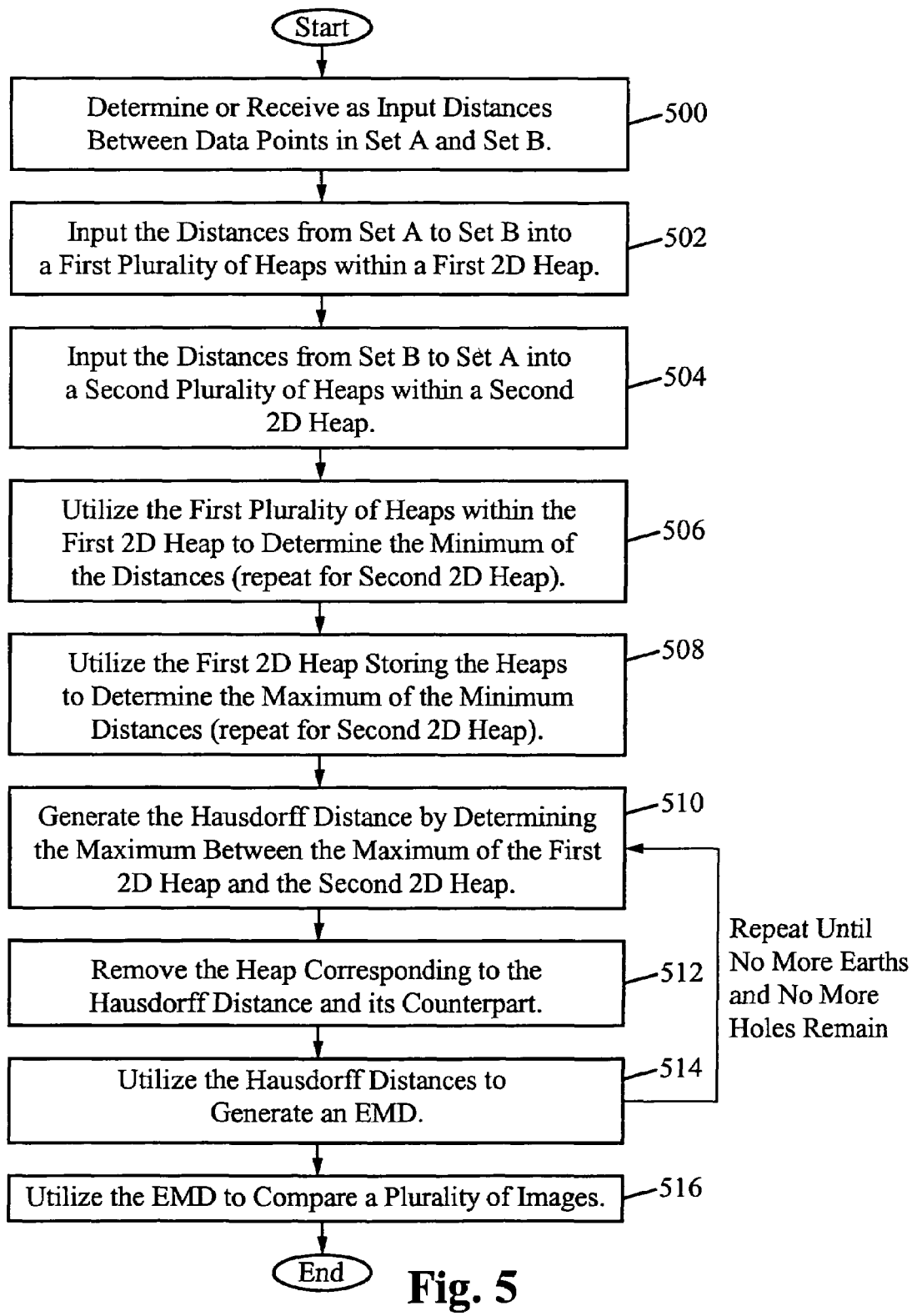
FIG. 5 illustrates the method of determining an EMD.

FIG. 5 illustrates the method of determining an EMD. In the step 500, distances between data points in Set A and Set B are either determined or received as input. Specifically, a program is able to calculate distances between the data points of the sets. Conversely, if the distance between the data points of the sets is already known and stored in a readable format, that data is able to be imported for application. In the step 502, the distances from Set A to Set B is then input into a first plurality of heaps within a first 2-D heap. The first plurality of heaps correspond to the horizontal rows described above, and the first 2-D heap corresponds to the 2-D heap described above which is a heap of heaps. In the step 504, the distances from Set B to Set A are input into a second plurality of heaps within a second 2-D heap. As in the step 502, the second plurality of heaps correspond to the horizontal rows described above, and the first 2-D heap corresponds to the 2-D heap described above which is a heap of heaps. In the step 506, the first plurality of heaps each determine their minimum by ordering the data using the "less than" inequality. The second plurality of heaps also each determine their minimum by ordering the data using the "less than" inequality in the step 506. In other embodiments, the first and second plurality of heaps are sorted before being input into the first and second 2-D heaps. In the step 508, the first 2-D heap orders the minimum distances stored in the first plurality of heaps by determining the maximum using the "greater than" inequality. Also, in the step 508, the second 2-D heap orders the minimum distances stored in the second plurality of heaps by determining the maximum. In the step 510, a Hausdorff distance is generated by determining the maximum between the maximum of the first 2-D heap and the maximum of the second 2-D heap. In the step 512, the heap corresponding to the Hausdorff distance and the heap's counterpart are removed from the first and second 2-D heaps. The acquired Hausdorff distance is then utilized to generate an EMD in the step 514. Earths are moved into holes based on the Hausdorff distance. The process starting with the step 510 through the step 514 is repeated until there are no more earths and no more holes remaining. After the EMD is generated, it is utilized to compare a plurality of images, in the step 516.

It should be recognized that although only two sets are described utilizing this method, any number of sets of data are able to implement this method to determine a Hausdorff distance and generate an EMD.

One of the applications EMD is able to be utilized for is Content-Based Image Retrieval (CBIR) also known as Query By Image Content (QBIC) and Content-Based Visual Information Retrieval (CBVIR). CBIR is the application of computer vision to the image retrieval problem of searching for digital images in large databases. "Content-based" means that the search uses the contents of the images themselves, rather than relying on metadata such as titles, captions or keywords. CBIR is needed and useful because of the limitations in metadata-based systems in addition to the increased bandwidth and processing power of the Internet. Textual information about images is easily searched using current technology, but requires those descriptions to be input by someone, which is highly burdensome and impractical when dealing with extremely large amounts of data. Furthermore, keyword searches for text have their own drawbacks such as requiring a user to accurately phrase his search, otherwise the search could result in nothing found.

CBIR systems are implemented in a number of different ways. One example permits a user to make a request, similar to a keyword search, such as "rabbit" and any images of rabbits are retrieved. However, unlike a keyword search where the word "rabbit" is searched for, the search looks for matching characteristics of an image that has a rabbit. Other systems search for texture, color and shape or even faces. The search could begin with a sample image provided by the user or via specifications of color schemes and textures. The results are returned in a variety of ways, and in some embodiments, they are sorted in ascending order starting with the smallest distance which correlates to the closest match. Another method of returning results only returns those images whose distance falls within a designated acceptable range. Of course, the accuracy of the search depends on how well the technology is able to match the user's image with those in the database. EMD is able to improve accuracy of a user's search as described above.

Alternatively, instead of the search being across the Internet, CBIR implementing EMD is performed on a local intranet or even on a user's computing device such as a personal computer, laptop, digital camera, digital camcorder, handheld, iPod® and home entertainment system. For example, if a user wants to find all of their baby pictures on the computer, they are able to use the aforementioned technologies and retrieve all pictures that resemble a baby.

Another application EMD is utilized with is a content recognition system. The content recognition system for indexing occurrences of objects within an audio/video content data stream processes the stream of data to generate a content index database corresponding to the content stream. The content stream is processed by applying recognition technology utilizing EMD and Hausdorff distances to the content within the content stream to identify and index occurrences of identified objects. In an embodiment, the content stream is processed as the content stream is stored within a media storage device. Alternatively, the content stream is processed after the content stream is stored within the media storage device. The objects that are included within the index database, are identified dynamically by the recognition technology using EMD during processing. As the content stream is processed, an entry for each object is generated within the index database. In some embodiments, each entry includes an object identifier and corresponding locations of that object. The locations reference where the particular content is stored within the media storage device. Once the content index database is generated, it is able to then be used to quickly locate and navigate to specific occurrences of content and objects within the content stream. The objects that are able to be identified and indexed include any identifiable information within a content stream, including shapes, objects, events and movements within video streams. In some embodiments, the content index database is stored on the same media storage device as the content stream.

Figure 6:
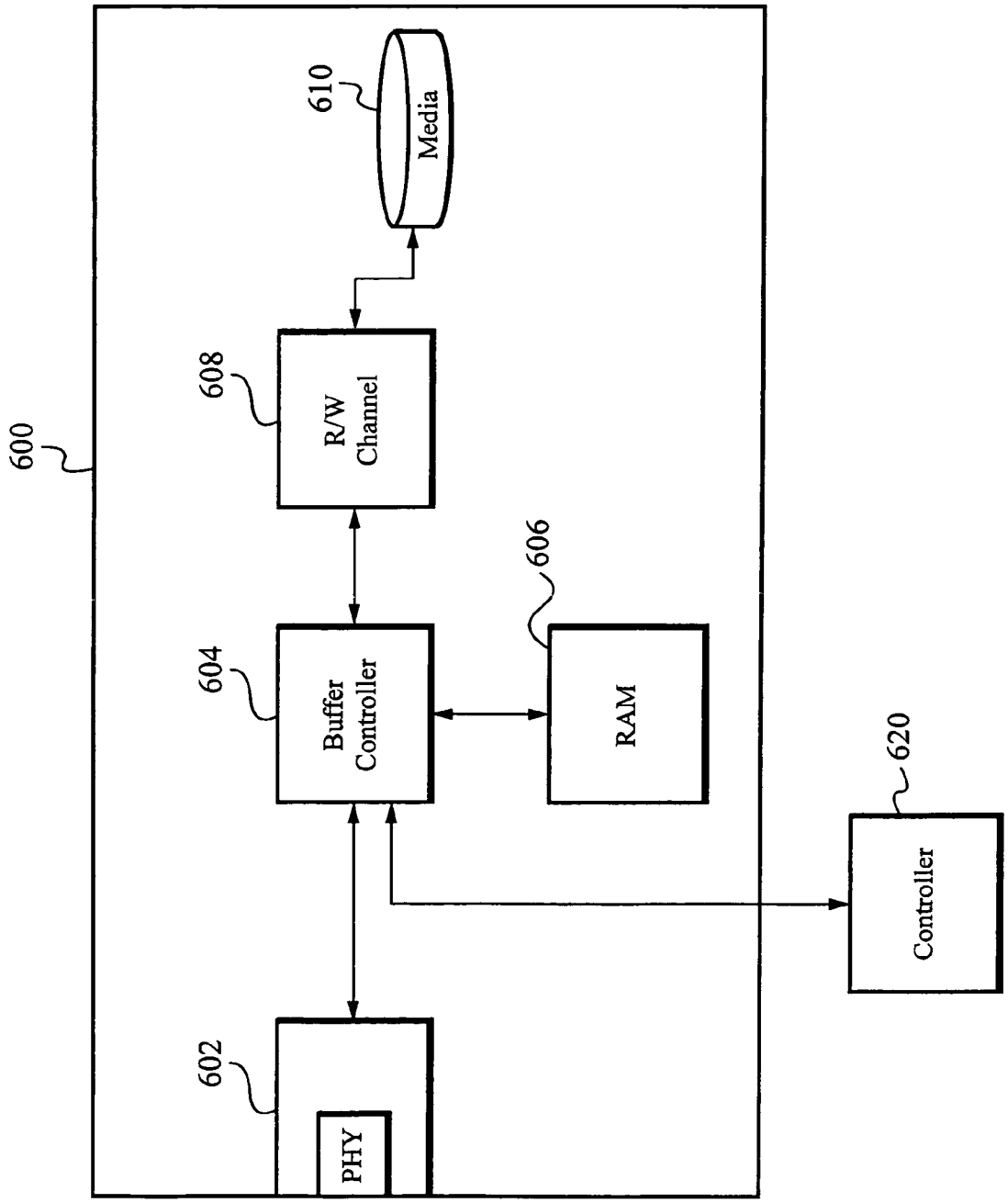
FIG. 6 illustrates a block diagram of a media storage device with external controller operating according to the present invention.

A media storage device with external controller is illustrated in FIG. 6. The media storage device 600 includes an interface circuit 602 for sending communications to and receiving communications from other devices coupled to the media storage device 600. The interface circuit 602 is coupled to a buffer controller 604. The buffer controller 604 is also coupled to a RAM 606 and to a read/write channel circuit 608. The read/write channel circuit 608 is coupled to media 610 on which data is stored within the media storage device 600. The read/write channel circuit 608 controls the storage operations on the media 610, including reading data from the media 610 and writing data to the media 610. An external controller 620 is coupled to the buffer controller 604 for controlling the processing, classifying and indexing of data streams stored on the media 610.

As the stream is processed, the recognition engine using EMD within the controller 620 analyzes the content within the content stream to identify the appropriate objects within the content stream. As described above, the appropriate objects are dynamically identified by the recognition engine during processing. As appropriate objects within the content stream are identified, the occurrence of those identified objects within the content stream is then recorded within an index database. Once the content stream is processed and the index database is generated, the user then has the capability to jump to locations within the content stream where the desired object occurs, for viewing or editing the content stream.

Figure 7:
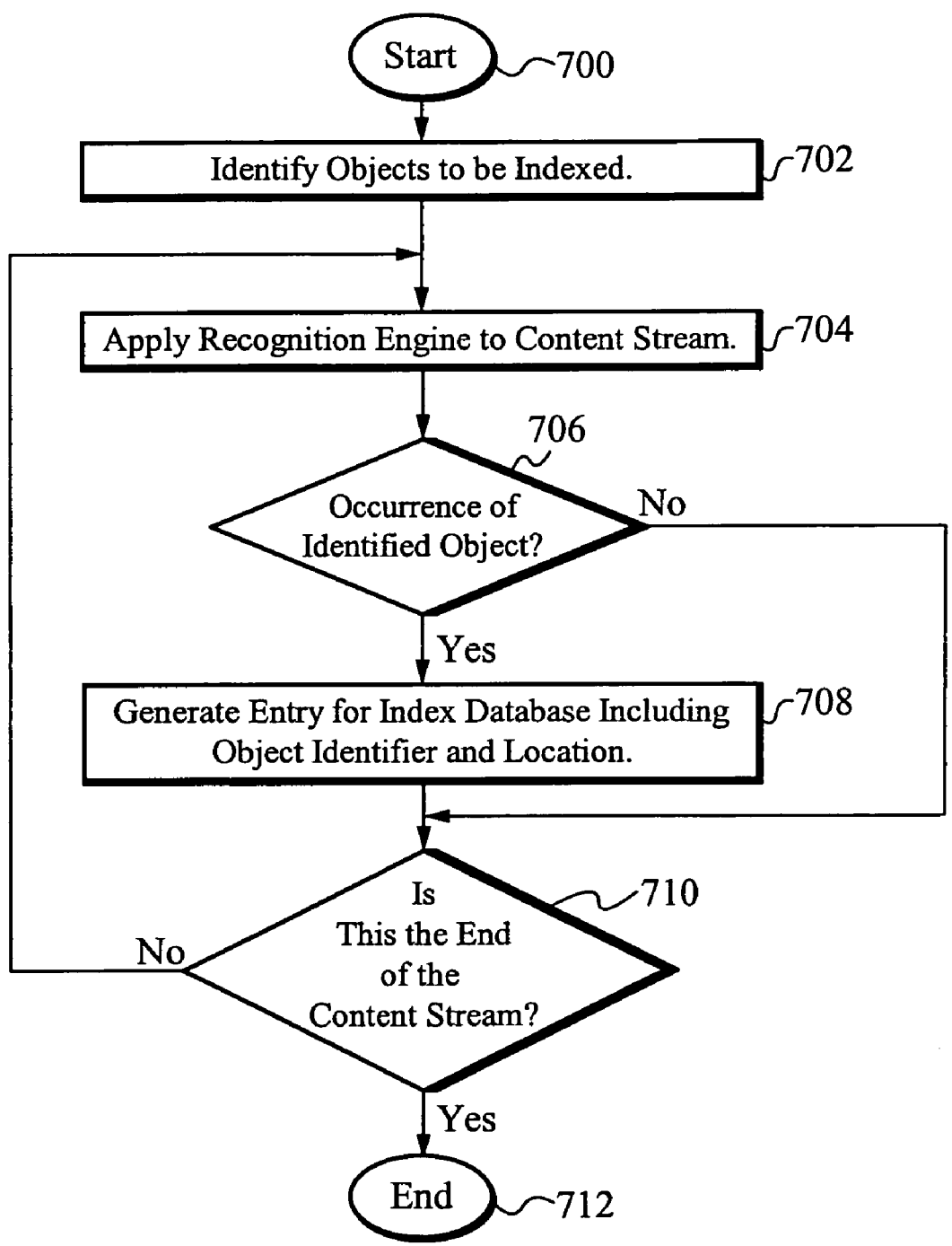
FIG. 7 illustrates a flowchart showing the steps implemented by the controller and the media storage device during processing of a content stream to generate an index database.

A flowchart showing the steps implemented in some embodiments by the controller 620 and the media storage device 600 during processing of a content stream to generate an index database is illustrated in FIG. 7. The process starts at the step 700. At the step 702, the objects to be indexed and included in the index database are identified. As described above, this identification is performed manually by the user or dynamically by the recognition technology using EMD during processing. At the step 704, the recognition engine or recognition technology is then applied to the content stream to analyze the content stream and determine the occurrence of identified objects within the content stream.

At the step 706, it is determined whether the content within the content stream that is currently being analyzed includes an identified object. If the content currently being analyzed does include an identified object, then at the step 708, an entry is generated for the index database, including the object identifier entry within the object category and an entry identifying the corresponding location of the content within the location category. After the generation of the entry for the index database at the step 708, or if it is determined at the step 706, that the content currently being analyzed does not include an identified object, it is then determined at the step 710, if there is more content within the content stream, or if this is the end of the content stream. If it is determined that the content stream has not yet been fully processed, then the process jumps back to the step 704, to continue processing the content stream. If it is determined at the step 710 that all of the content stream has been processed, then the process ends at the step 712.

Figure 8:
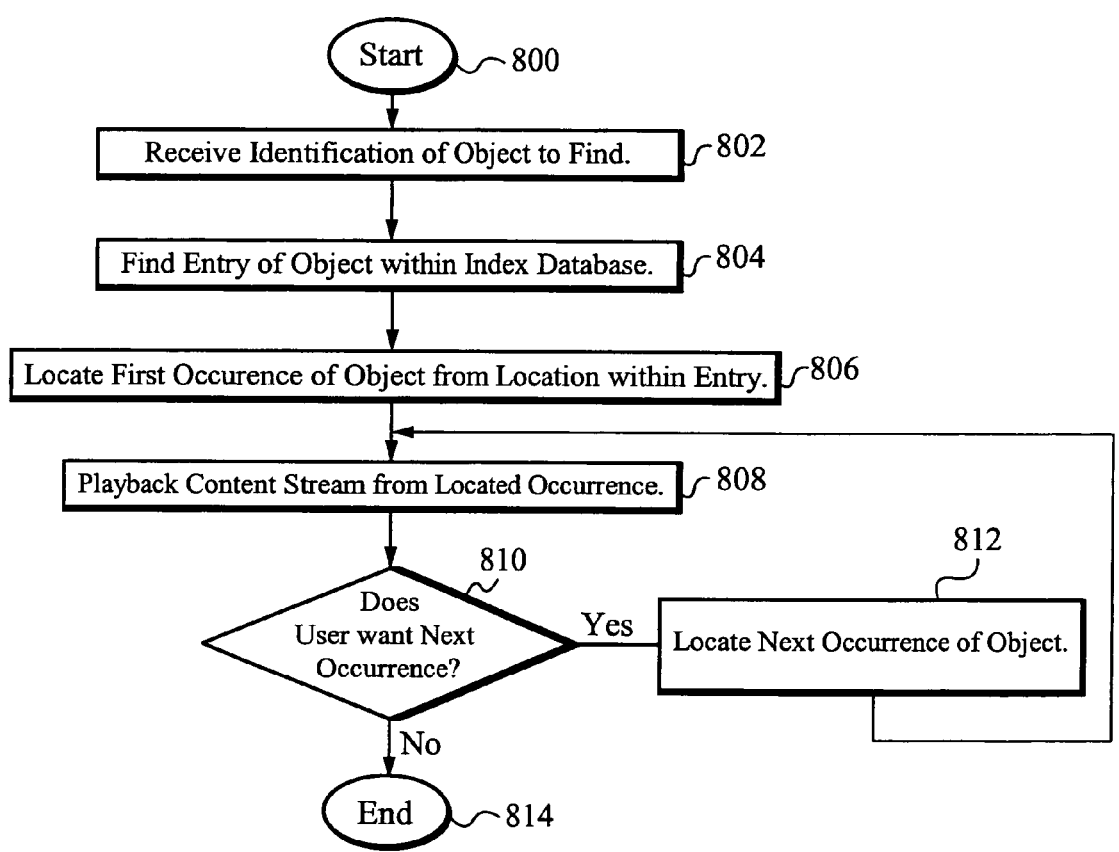
FIG. 8 illustrates a flowchart showing the steps implemented by the controller and the media storage device during playback of a content stream.

A flowchart showing the steps implemented in some embodiments by the controller 620 and the media storage device 600 during playback of a content stream, that has a corresponding index database, is illustrated in FIG. 8. The process starts at the step 800. At the step 802, a user identifies an object that they would like to locate within the content stream. At the step 804, the entry corresponding to the identified object is located within the index database and the location of the first occurrence of the object is targeted, using the entries from the object category and the location category. At the step 806, the first occurrence of the object is located within the content stream. At the step 808, this occurrence of the object is then played back for the user. At the step 810, it is then determined if the user wants the next occurrence of the object located and played back. If the user does want the next occurrence of the object located and played back, then the next occurrence of the object is located at the step 812. The process then jumps to the step 808 to playback this next occurrence. If it is determined at the step 810 that the user does not want the next occurrence of the object located and played back, the process then ends at the step 814.

As an example of the operation of the content recognition system and index database of the present invention, a user records a video of their child's birthday on a tape within a video recorder. This video includes audio and video components. The video is then recorded from the tape to a media storage device 600. Under the control of the controller 620 in conjunction with the media storage device 600, the video is processed to generate the index database by applying recognition technology including EMD to the video components to determine each occurrence of an identified object within the content stream. As described above, this processing occurs either as the video is recorded on the media storage device 600, if the user's system has the processing capability to perform the processing online, or after the video is stored on the media storage device 600. During processing the video is analyzed to determine each occurrence of an identified object. As an occurrence of an identified object is found within the video, an entry corresponding to that occurrence is then added to the index database. For example, if the user identifies that they want every occurrence of a birthday cake within the video indexed, the recognition technology is then applied to the video content stream to determine every occurrence of the birthday cake within the video. These occurrences are identified and indexed within the index database, as described above. If the user then wants to view these occurrences or edit the video based on these occurrences, the system will utilize the index database to playback these occurrences of the birthday cake within the video or edit the video based on the occurrences of the birthday cake within the video.

Alternatively, instead of generating an index database, a search system is implemented so that a user is able to request a search for something like a birthday cake, the system searches through the video and the images/video involving a birthday cake are queued to be viewed.

The method described herein is utilized in a number of applications, but generally is utilized to measure distance or dissimilarity between two distributions of points in a space. Utilizing the method comprises a number of steps. First, the distances between the data points are determined. The distances are able to be imported from another source if applicable. The distances from a first set (e.g. Set A) to a second set (e.g. Set B) are then ordered in a first plurality of heaps stored within a first heap of heaps, a first 2-D heap. The distances from the second set to the first set are ordered in a second plurality of heaps stored within a second heap of heaps, a second 2-D heap. Each plurality of heaps is ordered so that the minimum distance is the root node. Such ordering is accomplished using the "less than" operator. The plurality of heaps within the 2-D heaps are then ordered utilizing the "greater than" operator to determine the maximum of the root nodes which are the minimum distances of each of the heaps. The maximum of the first 2-D heap and the maximum of the second 2-D heap are then compared to determine the Hausdorff distance which is the greater of the two maximums. The corresponding heaps are removed from their respective 2-D heaps. The Hausdorff distance is utilized in a set of calculations to generate an EMD. The process of determining the Hausdorff distance and generating the EMD is repeated until no more earths and no more holes remain. When all of the earths have been moved to all of the holes, the work has been established, and the similarity of the plurality of images is determined. Utilizing this method, image comparison, image searching and other applications involving data comparison are possible.

In operation, the method described above improves the data comparison capabilities of whatever system it is utilized with. Speed and efficiency are improved greatly as the number of comparisons is reduced to $O(2 \log n)$. By determining a Hausdorff distance using 2-D heaps, such a distance is established rapidly, and then the Hausdorff distance is able to be utilized in a system that requires such knowledge. Specifically, for determining EMD, as each Hausdorff distance is popped off of the heaps, they are used in the summation which requires information regarding distance between earths and holes. Practically, such improved efficiency would greatly aid in image comparison, where in the past, such comparisons were very time consuming. Furthermore, since image comparison is useful for content based image recognition, applications such as searching a user's computer or across a network for an image is more readily possible using the aforementioned method. Programs able to implement such techniques include Operating System searches. For example, Windows® "Search" currently only searches via a "keyword" search where text is input and filenames are searched for that include the keyword. However, with content based image searching, implementing the method described above, an efficient search is able to retrieve results by comparing a chosen image with the set of images located on the user's hard drive. The method is also able to increase search capabilities over networks including the Internet so that textual searches are not the only option for searching.

In alternative embodiments, other color models are utilized besides CIE L*a*b*.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of comparing a first image with a second image, wherein the method is performed using a computing device, the method comprising:
   a. determining one or more Hausdorff distances, wherein determining each Hausdorff distance comprises:
      i. ordering a plurality of heaps within each of a plurality of 2-Dimensional heaps to determine a minimum within each of the plurality of heaps;
      ii. ordering each of the plurality of 2-Dimensional heaps to determine a maximum within each of the plurality of 2-Dimensional heaps; and
      iii. calculating a maximum of the maximums from the plurality of 2-Dimensional heaps; and
   b. calculating an earth mover's distance using the one or more Hausdorff distances by determining the work required to move one or more earths to one or more holes wherein each earth of the one or more earths corresponds to a color from a color distribution of the first image and each hole of the one or more holes corresponds to a color from a color distribution of the second image.

2. The method as claimed in claim 1 further comprising computing a plurality of distances of data points between the first image and the second image.

3. The method as claimed in claim 2 further comprising inputting the plurality of distances into the plurality heaps within each of the 2-Dimensional heaps.

4. The method as claimed in claim 1 wherein a keyword is used to determine the second image to compare.

5. The method as claimed in claim 1 wherein the second image is selected by a user.

6. The method as claimed in claim 1 wherein the shorter the earth mover's distance, the more similar the first image is to the second image.

7. The method as claimed in claim 1 wherein comparing occurs via the Internet.

8. The method as claimed in claim 1 wherein comparing occurs on a computing device selected from the group consisting of a personal computer, laptop, digital camera, digital camcorder, handheld, iPod® and home entertainment system.

9. The method as claimed in claim 1 wherein a size of each earth is an amount of the corresponding color in the first image, and a size of each hole is an amount of the corresponding color in the second image.

10. The method as claimed in claim 1 wherein the Hausdorff distance is determined between each earth of the one or more earths of the first image and each hole of the one or more holes of the second image.

11. A method of locating one or more images, wherein the method is performed using a computing device, the method comprising:
    a. selecting a first image to search for;
    b. comparing the first image with one or more second images, comprising:
       i. determining one or more Hausdorff distances, wherein determining each Hausdorff distance comprises:
          (1) computing a plurality of distances between data points of the first image and the second image;
          (2) inputting the plurality of distances into a plurality of heaps within a plurality of 2-Dimensional heaps;
          (3) ordering the plurality of heaps within each of the plurality of 2-Dimensional heaps using a "less than" operator;
          (4) ordering the plurality of 2-Dimensional heaps using a "greater than" operator; and
          (5) calculating a maximum of the maximums from the plurality of 2-Dimensional heaps; and
       ii. calculating an earth mover's distance using the one or more Hausdorff distances by determining the work required to move the one or more earths to the one or more holes wherein each earth of the one or more earths corresponds to a color from a color distribution of the first image and each hole of the one or more holes corresponds to a color from a color distribution of the one or more second images; and
    c. retrieving select ones of the one or more second images that have the earth mover's distance within a defined range.

12. The method as claimed in claim 11 further comprising plotting the first image and the one or more second images to a color model.

13. The method as claimed in claim 12 wherein the color model is CIE L*a*b*.

14. The method as claimed in claim 11 wherein selecting comprises entering in a keyword upon which an image matching that keyword is utilized to compare.

15. The method as claimed in claim 11 wherein selecting is performed by a user.

16. The method as claimed in claim 11 further comprising listing the one or more second images according to similarity to the first image.

17. The method as claimed in claim 16 wherein a smaller earth mover's distance means a higher similarity between the first image and the one or more second images.

18. The method as claimed in claim 11 wherein comparing and retrieving occurs via the Internet.

19. The method as claimed in claim 11 wherein comparing and retrieving occurs on a computing device selected from the group consisting of a personal computer, laptop, digital camera, digital camcorder, handheld, iPod® and home entertainment system.

20. The method as claimed in claim 11 wherein a size of each earth is an amount of the corresponding color in the first image, and a size of each hole is an amount of the corresponding color in the second image.

21. The method as claimed in claim 11 wherein the Hausdorff distance is determined between each earth of the one or more earths of the first image and each hole of the one or more holes of the second image.

* * * * *

UNITED STATES PATENT AND TRADEMARK OFFICE
CERTIFICATE OF CORRECTION

PATENT NO. : 7,577,684 B2  Page 1 of 1
APPLICATION NO. : 11/398326
DATED : August 18, 2009
INVENTOR(S) : Hawley Rising It is certified that error appears in the above-identified patent and that said Letters Patent is hereby corrected as shown below:

At column 10, line 3, in equation (3), please replace "yi" with "yj" so that the corresponding equation reads -- $\Sigma e_{ij} = y_j$       (3) --

Signed and Sealed this

Sixteenth Day of March, 2010

David J. Kappos
*Director of the United States Patent and Trademark Office*